United States Patent
Baessler et al.

(10) Patent No.: US 10,220,690 B2
(45) Date of Patent: Mar. 5, 2019

(54) ROOF FOR A MOTOR VEHICLE, IN PARTICULAR A PASSENGER VEHICLE

(71) Applicant: Daimler AG, Stuttgart (DE)

(72) Inventors: Thomas Baessler, Holzgerlingen (DE); Achim Demmer, Magstadt (DE); Hans-Peter Kuttner, Weil im Schoenbuch (DE)

(73) Assignee: Daimler AG, Stuttgart (DE)

(*) Notice: Subject to any disclaimer, the term of this patent is extended or adjusted under 35 U.S.C. 154(b) by 0 days.

(21) Appl. No.: 15/571,704

(22) PCT Filed: May 3, 2016

(86) PCT No.: PCT/EP2016/000725
§ 371 (c)(1),
(2) Date: Nov. 3, 2017

(87) PCT Pub. No.: WO2016/177465
PCT Pub. Date: Nov. 10, 2016

(65) Prior Publication Data
US 2018/0154750 A1 Jun. 7, 2018

(30) Foreign Application Priority Data

May 6, 2015 (DE) .......... 10 2015 005 802

(51) Int. Cl.
*B60J 7/22* (2006.01)
*B60J 7/00* (2006.01)
*B60J 7/043* (2006.01)

(52) U.S. Cl.
CPC ............ *B60J 7/22* (2013.01); *B60J 7/0046* (2013.01); *B60J 7/043* (2013.01)

(58) Field of Classification Search
CPC .................. B60J 7/22; B60J 7/0046
USPC ................................................ 296/217
See application file for complete search history.

(56) References Cited

FOREIGN PATENT DOCUMENTS

| DE | 10005 042 187 A1 | 3/2007 |
|---|---|---|
| EP | 1 974 970 A1 | 10/2008 |
| JP | S58 70916 U | 5/1983 |
| JP | 2006 315015 A | 11/2006 |

OTHER PUBLICATIONS

PCT/EP2016/000726, International Search Report dated Sep. 14, 2016 (Two (2) pages).

*Primary Examiner* — Dennis H Pedder
(74) *Attorney, Agent, or Firm* — Crowell & Moring LLP

(57) ABSTRACT

A roof for a motor vehicle is disclosed. The roof has a cover element which can be moved in the longitudinal direction of the vehicle between a closed position and at least one open position and a wind deflector which is arranged on a front edge of the roof opening and which can be moved between a retracted position and at least one extended position. The cover element is wider than the wind deflector. At least one wind deflecting element is arranged on both sides outside the wind deflector. In an extended position, the respective wind deflecting element can be exposed in the manner of an ascending ramp or inclined plane towards the rear in the direction of the cover element arranged in the open position such that lateral, outer partial regions of the cover element are covered towards the front by the respective wind deflecting elements.

10 Claims, 4 Drawing Sheets

ROOF FOR A MOTOR VEHICLE, IN PARTICULAR A PASSENGER VEHICLE

BACKGROUND AND SUMMARY OF THE INVENTION

The invention relates to a roof for a motor vehicle, in particular a passenger vehicle.

EP 1 974 970 A1 discloses such a roof for a motor vehicle, in particular a passenger vehicle which comprises at least one cover element which can be moved in the longitudinal direction of the vehicle between a closed position for closing at least one partial region of a roof opening and at least one open position for uncovering the partial region. In other words, in the completely manufactured state of the motor vehicle, at least one partial region of a roof opening of the motor vehicle is closed by the closed cover element. In the open position, the cover element uncovers the partial region such that, for example, occupants located in the interior of the motor vehicle can look through the uncovered partial region to the surroundings of the motor vehicle. In this case, the roof is formed, for example, as a sliding roof, in particular as an external sliding roof, wherein the cover element can be moved in the longitudinal direction of the vehicle. The roof can also be formed as a sliding/tilting roof, wherein the cover element, in particular at least a rear edge of the cover element, can be displaced in the vertical direction of the vehicle.

The roof also comprises a wind deflector which is arranged at least on a front edge of the roof opening and which can be moved between a retracted position and at least one extended position. In this case, the wind deflector comprises, for example, at least one inherently rigid tensioning element, in particular in the form of a bracket, which can be displaced relative to a roof frame, in particular front roof frame, in the vertical direction of the vehicle. This roof frame delimits the roof opening towards the front, for example in the longitudinal direction of the vehicle. Furthermore, the wind deflector comprises, for example, a flexible net which can be flowed through by air and which is connected to the tensioning element and can thus also be shifted with the tensioning element. In the extended position, the flexible net is stretched by the tensioning element since the flexible net, for example, is held on one side on the tensioning element and on the other side on the roof frame, and is thus stretched between the tensioning element and the roof frame. In the retracted position, in which the tensioning element is arranged at least partially closer to the roof frame compared to the extended position, the net is folded up. By means of the wind deflector, undesirable air flows and resulting rattling noises which can be noticed in the interior can be avoided or at least kept to a minimum in the open position of the cover element.

JP 2006 315615 A discloses a motor vehicle having a roof which is provided with a roof opening. The roof opening can be opened and closed by means of a cover element which can be shifted between a closed and an open position. On the front edge of the roof opening and on the lateral edges of the roof opening, a wind deflector which is able to be shifted between a retracted and an extended position is provided respectively in the form of a rectangular shield which, in the extended state, together virtually frame the roof opening and are inclined in each case in the direction towards the middle of the roof opening.

JP S58 70916 U discloses a motor vehicle having a roof provided with a shiftable cover element. A roof opening can be closed and uncovered by means of the cover element which can be displaced between a closed and an open position. A multi-part wind deflector is provided on the front edge of the roof opening, the partial elements of which can be moved between a retracted and an extended position, wherein a middle partial element can be moved independently of the adjacent outer partial elements.

DE 10 2005 042 187 A1 discloses a wind deflector in which a respectively allocated veneer is provided between the lateral end face of a cover element and the opening edge of a roof frame, the veneer extending in the deflection position of the cover element at least in a longitudinal region of the allocated lateral end face of the cover element. By means of this veneer, it is possible to achieve a reduction in wind noises, in particular in the case of an oblique incident flow of the wind deflector, in the region of the lateral end face of the cover element.

The object of the present invention is to further develop a roof of the type discussed here in such a way that, in particular when the cover element is open, a particularly high driving comfort can be achieved.

The roof comprises at least one cover element, which can be moved in the longitudinal direction of the vehicle between a closed position for closing at least one partial region of a roof opening and at least one open position for uncovering the partial region, and at least one wind deflector which is arranged on a front edge of the roof opening and which can be moved between a retracted position and at least one extended position. Here, provision is made for the cover element to be wider than the wind deflector and for at least one respective wind deflecting element to be arranged on both sides in the transverse direction of the vehicle outside the wind deflector, the wind deflecting element being able to move between a retracted position and at least one extended position.

Provision is made according to the invention that, in its extended position, as seen in the longitudinal direction of the vehicle, the respective wind deflecting element can be exposed in the manner of an ascending ramp or inclined plane towards the rear in the direction of the cover element arranged in the open position in such a way that lateral, outer partial regions of the cover element are covered towards the front in the longitudinal direction of the vehicle by the respective wind deflecting element.

In the extended position, the respective wind deflecting element is arranged in the vertical direction of the vehicle, at least in sections, further upwards than in the retracted position such that air or air streams can be guided or influenced particularly advantageously by means of the respective wind deflecting element in the respective extended position. A particularly high driving comfort can be achieved by means of the wind deflecting elements which are arranged further outwards in the transverse direction of the vehicle than the wind deflector, since undesirable air flows and the resulting noises which are audibly noticeable in the interior can be avoided particularly effectively or at least kept to a minimum by at least partial air flows in the lateral outer regions of the front edge of the open cover element being guided away or deflected over this or the front edge thereof.

In particular, when the cover element is open, excessive wind noises can be avoided such that a particularly comfortable ride can thus be achieved with the cover element open.

The background of the invention is that conventional wind deflectors that are formed as bracket wind deflectors, for example, and which comprise a flexible net which can be flowed through by air and at least one inherently rigid tensioning element, in particular in the form of a bracket, are arranged internally in a dry region and consequently are not wider or maximally as wide as the at least partially uncovered roof opening in the open position of the cover element. Furthermore, the cover element, in particular in the case of a roof which is formed as a sliding roof, in particular an external sliding roof (ASD), is usually wider than the roof opening and may therefore also be wider than the wind deflector. Thus, for example, lateral partial regions of the cover element in the longitudinal direction of the vehicle are usually not covered towards the front by the wind deflector or its width such that these partial regions of the cover element which are not covered by the wind deflector can cause wind noises when driving.

Due to the fact that provision is now made in the roof according to the invention to arrange at least one respective wind deflecting element, which can be inclined from front bottom to rear top, on both sides of the wind deflector in the transverse direction of the vehicle outside the wind deflector, partial regions, in particular edge regions, of the cover element arranged in the transverse direction of the vehicle outside the wind deflector can be covered or overlapped towards the front in the longitudinal direction of the vehicle by the respective wind deflecting elements, in particular when the cover element is in an open position and the wind deflecting elements are in their respective extended position. As a result, an unfavorable inflow or flow around the cover element, in particular its front edge in the longitudinal direction of the vehicle, can be avoided during driving such that excessive and undesirable wind noises can also be avoided. Despite the fact that the cover element is designed to be wider than the wind deflector in the transverse direction of the vehicle, an advantageous driving comfort can still be achieved when the cover element is open, since the partial regions of the cover element arranged further outwards than the wind deflector in the transverse direction of the vehicle can be covered towards the front by the respective wind deflecting elements in the longitudinal direction of the vehicle. An unfavorable inflow or flow around the cover element, in particular its front edge and in particular the partial regions, can then be avoided by means of the wind deflecting elements.

The roof according to the invention is preferably formed as a sliding roof and, in particular, as an external sliding roof (ASD), wherein the cover element has a particularly large width extending in the transverse direction of the vehicle. In this case, the cover element is, for example, wider than the roof opening and wider than the wind deflector, wherein an advantageous driving comfort can be achieved by using the wind deflecting elements.

In a particularly advantageous exemplary embodiment of the roof, provision is made that, in the case of a wind deflecting element which is, in its extended position, exposed towards the rear in the direction of the cover element arranged in the open position, a rear edge of the wind deflecting element, as seen in the longitudinal direction of the vehicle, is arranged at the same height as a front edge of the cover element, as seen in the longitudinal direction of the vehicle. This ensures that the air stream is guided away quietly over the cover element arranged in the open position and does not collide head-on with the front narrow side of the cover element.

Further advantages, features and details of the invention arise from the description of a preferred embodiment below and with the aid of the Figures.

DETAILED DESCRIPTION OF THE DRAWINGS

Figure 1:
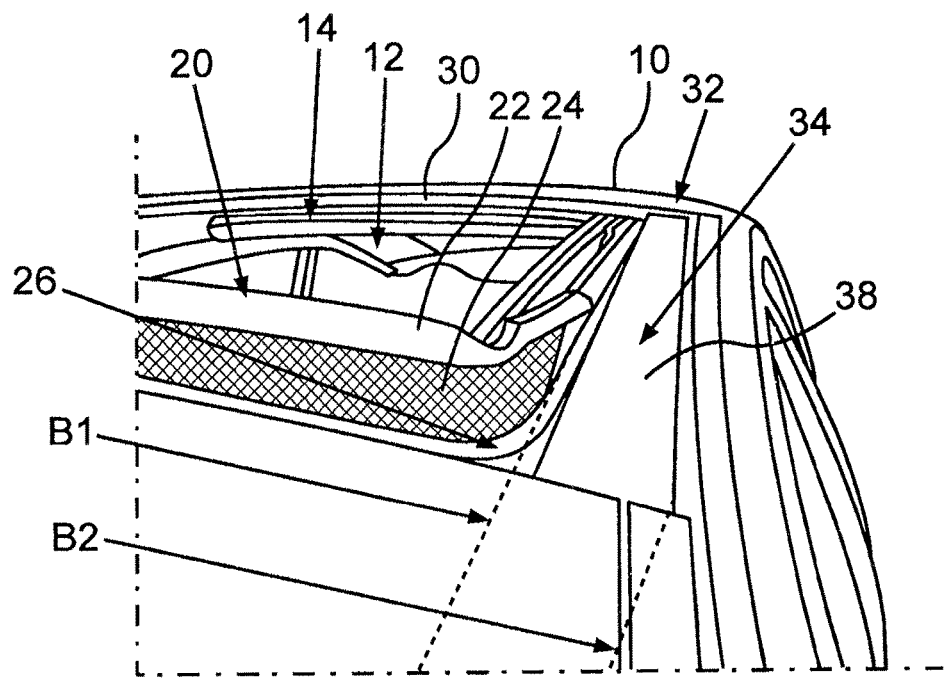
FIG. 1 shows sectionally, a schematic and perspective top view of a roof for a motor vehicle in the form of a passenger vehicle, having at least one cover element which can be moved in the longitudinal direction of the vehicle between a closed position for closing at least one partial region of a roof opening and at least one open position for uncovering the partial region, having a wind deflector which is arranged at least on a front edge of the roof opening and which can be moved between a retracted position and at least one extended position, and having wind deflecting elements arranged on both sides in the transverse direction of the vehicle outside the wind deflector which can be moved respectively between a retracted position and at least one extended position.

In the Figures, the same or functionally identical elements are provided with the same reference numerals.

FIG. 1 is a schematic and perspective top view of a roof for a motor vehicle in the form of a passenger car. In the present case, the roof is provided with a sliding roof system which is formed as an external sliding roof. The sliding roof system here has at least one cover element 10 which can be moved in the longitudinal direction of the vehicle (x direction) between at least one open position shown in FIG. 1 and a closed position illustrated in FIG. 2a in the completely manufactured state of the motor vehicle. In the closed position, at least one partial region 12 of a roof opening of the passenger vehicle which is referred to as a whole with 14 is closed by the cover element 10.

Figure 2A:
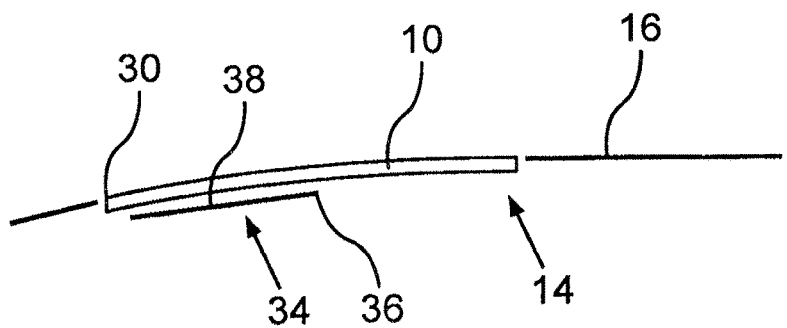
FIGS. 2 a, b show sectionally in each case, a schematic sectional view through the roof according to FIG. 1.
Figure 2B:
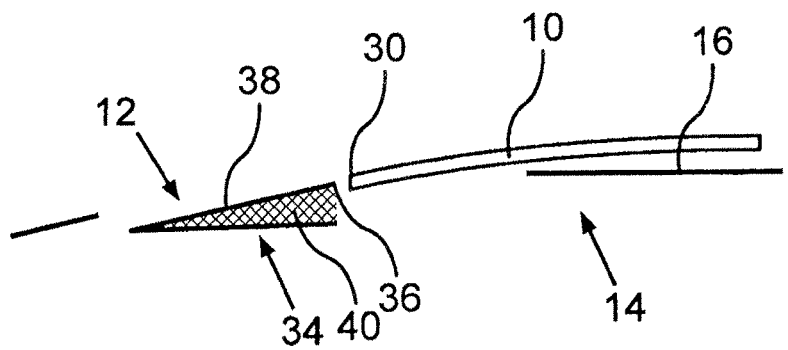

As can be seen in FIGS. 1 and 2b, in its open position, the cover element 10 uncovers the partial region 12 of the roof opening 14 such that, for example, occupants located in the interior of the passenger vehicle can look out through the uncovered partial region 12 to the surroundings of the passenger vehicle.

The roof is, for example, a roof module which is inserted into the roof opening 14 which is delimited by the shell of the passenger vehicle. The roof opening 14 is delimited in the transverse direction of the vehicle, for example, by lateral roof frames or roof frame parts extending in the longitudinal direction of the vehicle and is delimited in the longitudinal direction of the vehicle by respective roof frames or roof frame parts extending in the transverse direction of the vehicle (y direction), wherein the roof module is attached, for example, at least to the lateral roof frame. The roof module preferably has a frame itself, on which at least the movable cover element 10, if necessary an additional movable or immovable cover element and, if necessary, also guides, in particular guide rails, and/or a drive for at least the movable cover element 10 and/or parts of a wind deflection device, which is described in more detail below, are arranged. The roof module can be completed in a pre-assembly step outside the vehicle, i.e., the components provided are attached to the frame such that the roof module can be inserted as a whole into the roof opening 14, preferably from the outside. In a preferred embodiment, it is provided that the roof module is firmly bonded, in particular adhered, to the actual roof frame of the shell. If necessary, mechanical fastening means are additionally or alternatively provided.

A panelling element 16 can also be seen in FIGS. 2a and 2b, by means of which the shell of the passenger vehicle is clad. This panelling element 16 could also be part of the roof module described above. When the cover element 10 is opened, it is pushed towards the rear in the longitudinal direction of the vehicle over the panelling element 16 and not under it, such that the roof is formed as an external sliding roof.

Figure 4:
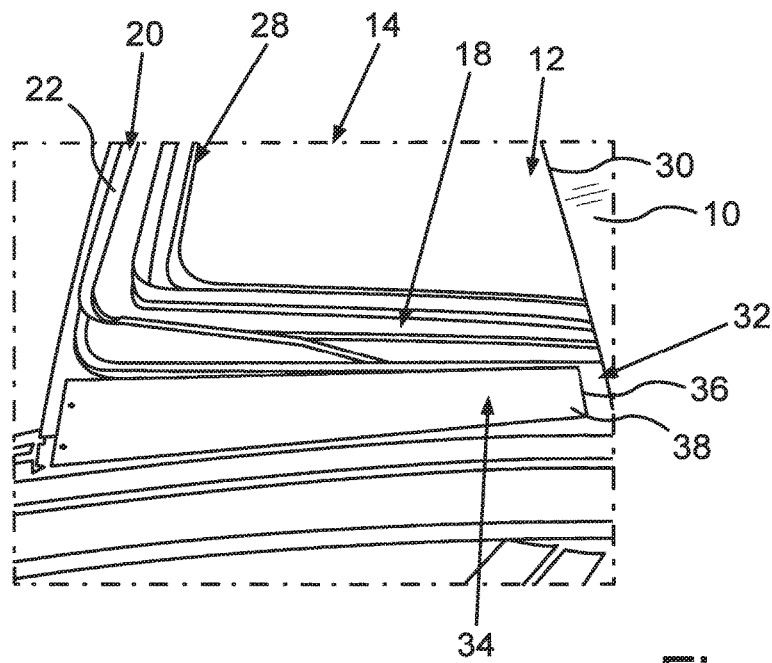
FIG. 4 shows sectionally, an additional and schematic and perspective top view of the roof according to FIG. 1.

FIG. 4 shows that the roof has lateral guide rails which extend at least substantially in the longitudinal direction of the vehicle, of which guide rails the left guide rail referred to with 18 can be seen in FIG. 4. The cover element 10 can therefore be translationally moved along the guide rails in the longitudinal direction of the vehicle between the open position and the closed position. The abovementioned roof module comprises, for example, at least one inherently rigid frame, which cannot be seen in the Figures, by means of which the roof module is connected to the shell. Here, the guide rails are fastened to the frame.

The roof also comprises a wind deflector 20 which can be seen particularly well in FIG. 1, the wind deflector 20 being formed as a bracket wind deflector. The wind deflector 20 comprises at least one preferably inherently rigid tensioning element in the form of a substantially U-shaped bracket 22 and a flexible net 24 which is held on the bracket 22 and can be flowed through by air. The net 24 is, for example, held on the bracket 22 on one side and, on the other side, is connected to the front roof frame or preferably to the frame of the roof module in the longitudinal direction of the vehicle. The wind deflector 20, in particular the bracket 22, can be displaced in the vertical direction of the vehicle between an extended position shown in FIG. 1 and at least one retracted position relative to the front roof frame and the frame of the roof module. Since the net 24 is connected to the bracket 22, the net 24 is shifted or displaced when the bracket 22 is displaced. It is clear from FIG. 1 that the flexible net 24 is stretched in the extended position of the wind deflector 20 between the bracket 22 and the front roof frame or the frame of the roof module. In the extended position, the bracket 22 is arranged further upwards in the vertical direction of the vehicle than in the retracted position, wherein the distance extending in the vertical direction of the vehicle between the bracket 22 and the front roof frame or the frame is bridged by the net 24.

The wind deflector 20, in particular the bracket 22, is coupled to the cover element 10 or the movement of the cover element to the extent that the bracket 22 is shifted into the extended position when the cover element 10 is opened. If the cover element 10 is closed, the bracket 22 is moved from its extended position into its retracted position, as a result of which the net 24 is folded up.

By means of the wind deflector 20, undesirable air flows and resulting undesirable rattling noises which are audibly noticeable in the interior of the passenger vehicle can be avoided or at least kept to a minimum when driving with the cover element 10 open such that a high driving comfort can be achieved. In this case, the wind deflector 20 is designed on the inside. This means that the wind deflector 20 is arranged in an internal dry region which is delimited by a cover seal referred to with 26. The cover seal 26 comprises at least one sealing element, by means of which the cover element 10 is sealed against the shell in the closed position.

It is particularly clear when viewing together with FIG. 4 that the wind deflector 20 is arranged on a front edge 28 of the roof opening 14 in the longitudinal direction of the vehicle, wherein the bracket 22 extends a little further towards the rear around the edge 28 in the longitudinal direction of the vehicle. This means that the two legs of the U-shaped bracket extend in the longitudinal direction of the vehicle and are preferably arranged above the guide rails for the cover element 10 congruently with these. In this way, by means of the wind deflector 20, a lateral part of the roof opening 14 is also shielded by means of the net 24.

FIG. 1 illustrates a width of the wind deflector 20 which is referred to with B1 and extends in the transverse direction of the vehicle. Furthermore, FIG. 1 illustrates a width of the cover element 10 formed as a sliding cover which is referred to with B2. It is therefore particularly clear from FIG. 1 that the wind deflector 20 is only slightly wider than the roof opening 14, wherein the cover element 10 is substantially wider than the roof opening 14 and, in particular, substantially wider than the wind deflector 20. Thus, for example, when the cover element 10 is open, only a middle partial region of an edge 30 of the cover element 10 which is at the front in the longitudinal direction of the vehicle is covered towards the front in the longitudinal direction of the vehicle by the wind deflector 20 when the cover element 10 is opened and the wind deflector 20 is in its extended position. Lateral and outer partial regions 32 of the front edge 30 of the cover element 10, which are outwardly adjacent on both sides to the middle partial region in the transverse direction of the vehicle, are arranged further outwards than the wind deflector 20 in the transverse direction of the vehicle and are accordingly not covered towards the front in the longitudinal direction of the vehicle by the wind deflector 20 in the extended position of the wind deflector 20 and in the open position of the cover element 10. Since the outer cover element 10 is thus wider than the wind deflector 20, the wind deflector 20 is not effective for the abovementioned partial regions 32, which are also referred to as cover outer regions. As a result, undesirable inflow or flow around the cover element partial regions 32 can occur, which could result in undesirable wind noises.

Figure 3:
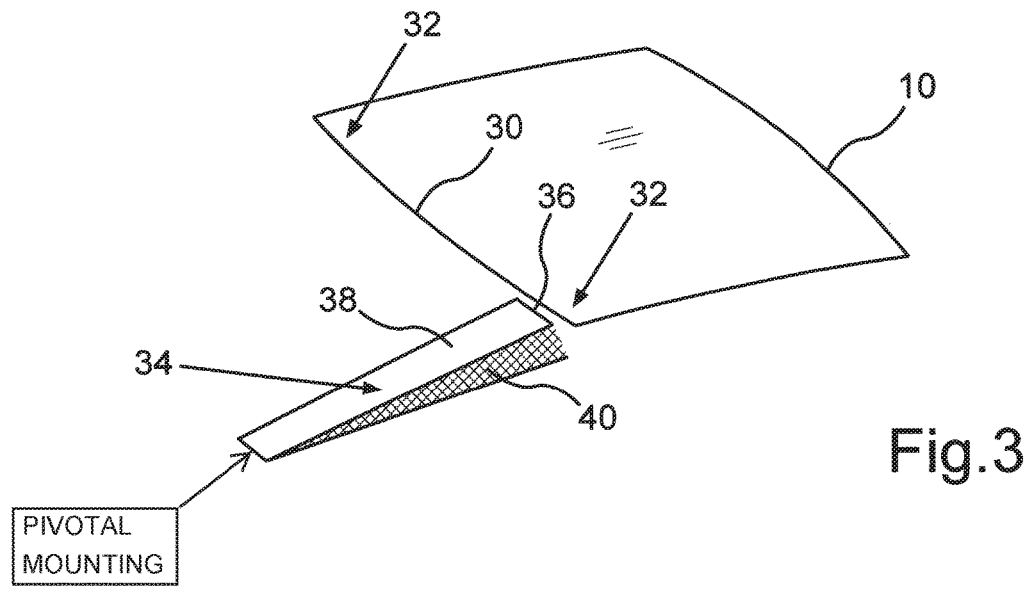
FIG. 3 shows sectionally, a schematic and perspective top view of the roof according to FIG. 1, wherein one of the wind deflecting elements is shown in FIG. 3 which is in its extended position.

In order to avoid these undesirable wind noises and to achieve particularly high driving comfort with the cover element 10 open, a respective wind deflecting element in the form of an aeroacoustic shield 34 is arranged on both sides outside the wind deflector 20 or next to the wind deflector 20 in the transverse direction of the vehicle. In other words, an aeroacoustic shield 34 is arranged in each case in the transverse direction of the vehicle on the right outside the wind deflector 20 and in the transverse direction of the vehicle on the left outside the wind deflector 20, wherein the respective aeroacoustic shield 34 is arranged between a retracted position shown in FIG. 1 and FIG. 2a and at least one extended position, for example, shown in FIG. 2b and FIG. 3 relative to the shell. In this case, the respective aeroacoustic shield 34 is held at least indirectly pivotally on the shell, in particular the frame, such that at least one edge 36 of the respective aeroacoustic shield 34, which is at the rear in the longitudinal direction of the vehicle, can be displaced in the vertical direction of the vehicle relative to the shell. The respective aeroacoustic shield 34, which is also referred to as an acoustic shield, can thus be folded in and folded out, i.e., raised or lowered towards the front, in the forward travel direction of the vehicle. In order to carry out a particularly simple installation of the roof module, it is preferably provided that the respective aeroacoustic shield 34 is also held on the frame of the roof module.

The respective aeroacoustic shield 34 is coupled to the cover element 10 to the extent that the aeroacoustic shield 34 is folded out and thus moved into its extended position when the cover element 10 is open. When the cover element 10 is closed, the respective aeroacoustic shield 34 is also folded back in again, i.e., moved into its retracted position.

It can be seen from FIG. 2b that the respective aeroacoustic shield 34 is arranged in the extended position and in the open position of the cover element 10 at the height of the front edge 30 of the cover element 10, such that the edges 36 and 30 are arranged at the same height. As a result, the lateral, outer partial regions 32 of the cover element 10 are covered towards the front in the longitudinal direction of the vehicle by the respective aeroacoustic shields 34 such that unfavorable inflows or flows around the edge 30 in the partial regions 32 can be avoided by the aeroacoustic shields 34.

The aeroacoustic shields 34 are, for example, shifted from the extended position into the retracted position by at least one respective slider arranged on the cover element 10 when the cover element 10 is closed and are held in the retracted position. When the cover element 10 is opened, the aeroacoustic shields 34 preferably fold towards the rear, i.e., spring actuated, for example, in the region of their respective front edge 36, from the height of the front edge 30 of the cover element 10.

In other words, at least one spring element is provided, for example, for actuating the respective aeroacoustic shield 34 which is supported on one side, for example, on the respective aeroacoustic shield 34 and, on the other hand, on the frame. In the retracted position of the aeroacoustic shield 34, the spring element is tensioned against the extended position such that a spring force from the spring element acts on the wind deflecting element (aeroacoustic shield 34). By means of the cover element 10, the aeroacoustic shields 34 are held in the retracted position against this spring force application. When the cover element 10 is opened, the respective spring element can be loosened, whereby the respective wind deflecting element (aeroacoustic shield 34) is moved from the retracted position into the extended position by means of the spring force.

Figure 5:
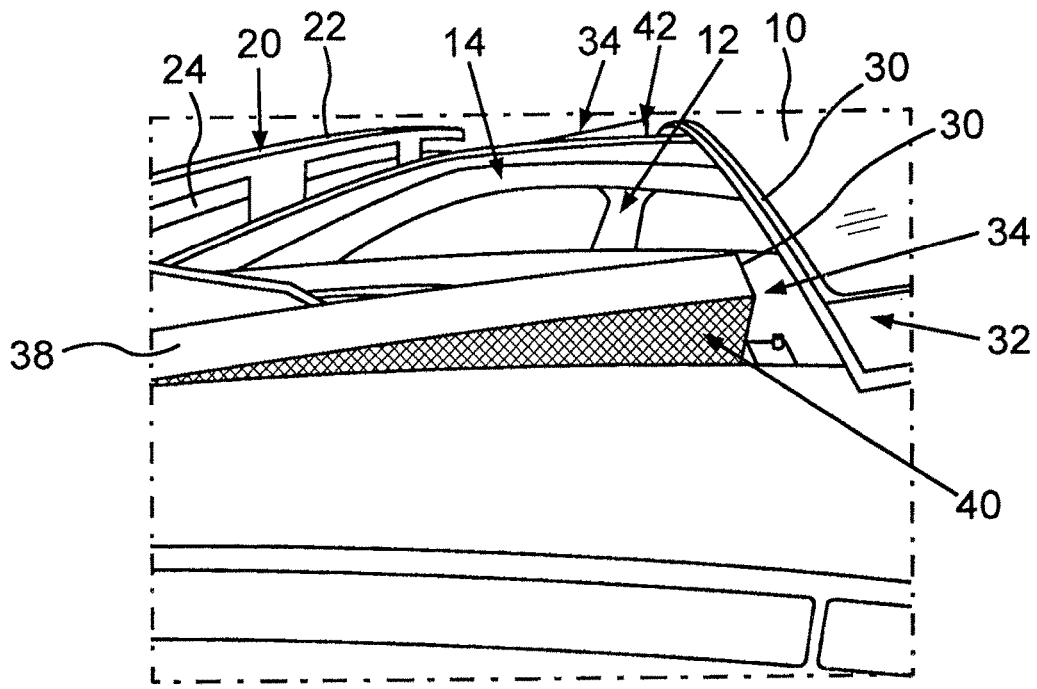
FIG. 5 shows sectionally, a schematic and perspective side view of the roof according to FIG. 1, wherein one of the wind deflecting elements is in its extended position.
Figure 6:
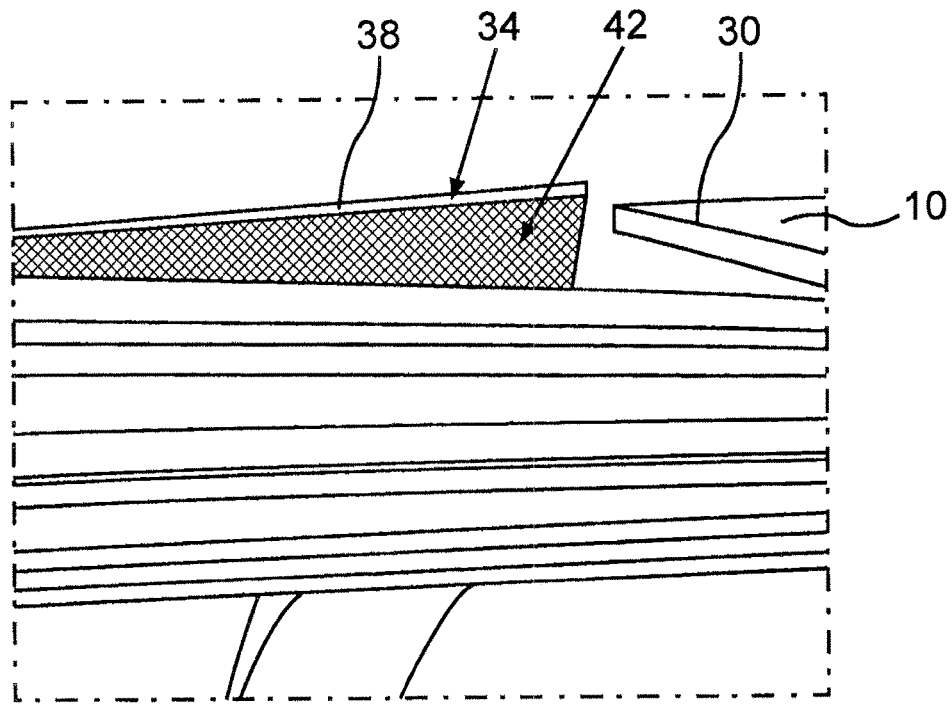
FIG. 6 shows sectionally, an additional schematic side view on the roof according to FIG. 1.
Figure 7:
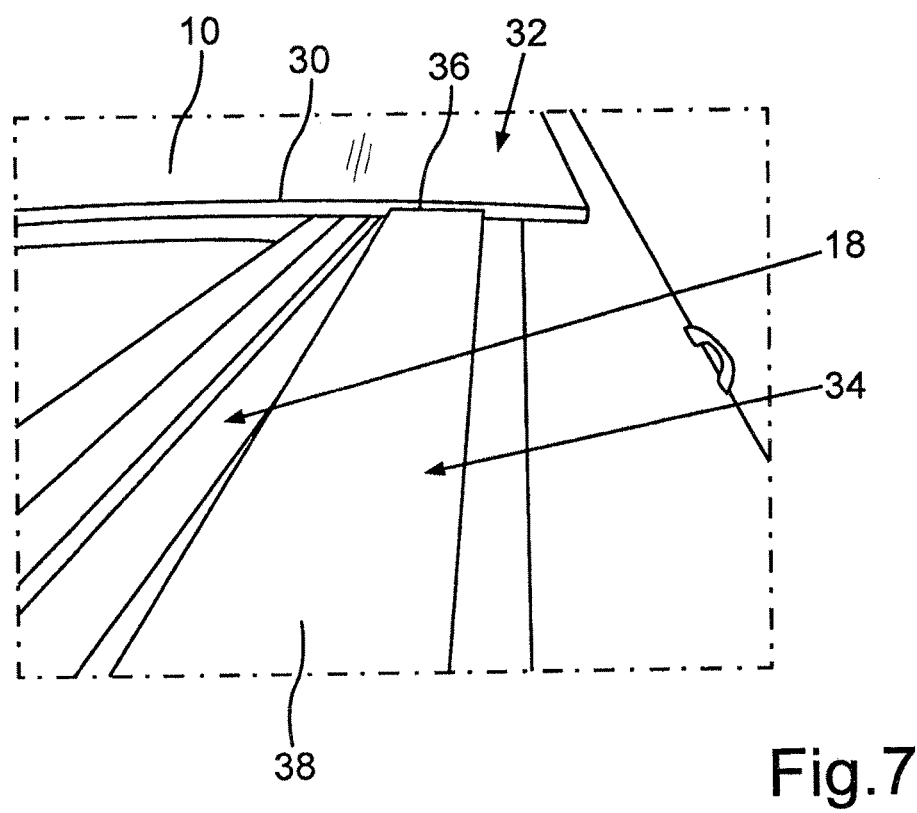
FIG. 7 shows sectionally, an additional schematic and perspective top view of the roof according to FIG. 1.

FIG. 4 shows the left-hand aeroacoustic shield 34 in its retracted position. FIG. 5 to FIG. 7 show the left-hand aeroacoustic shield 34 in its extended position. As can be seen particularly clearly in FIG. 3 and FIG. 5 to FIG. 7, the respective aeroacoustic shield 34 comprises an additional inherently rigid tensioning element in the form of a lamella 38 which is rectangular in this case, a flexible outer net 40 which can be flowed through by air and a flexible inner net 42 which can be flowed through by air and cannot be seen in FIG. 3 and can be seen in FIG. 6. The nets 40 and 42 are held on the lamella 38 and can thus be shifted with the lamella 38 between the extended position and the retracted position. On the other side, the nets 40 and 42 are, for example, at least indirectly held on the shell, in particular on the frame, such that the nets 40 and 42 are stretched between the frame and the lamella 38 in the extended position. In this case, the nets 40 and 42 are arranged at a distance from each other in the transverse direction of the vehicle (y direction) and bridge a distance extending in the vertical direction of the vehicle (z direction) between the frame and the lamella 38, since the lamella 38 is spaced further upwards in the vertical direction of the vehicle and thus further from the frame in the extended position than in the retracted position.

In the closed position of the cover element 10, the aeroacoustic shields 34 are arranged below the partial regions 32 of the cover element 10, wherein the aeroacoustic shields 34 are arranged in front of the partial regions 32 in the longitudinal direction of the vehicle in the open position of the cover element 10.

As can be seen particularly clearly in FIG. 4, the respective aeroacoustic shield 34 is designed to correspond in its length extending in the longitudinal direction of the vehicle to the length extending in the longitudinal direction of the vehicle of the partial area 12 of the roof opening 14 which is uncovered by the cover element 10. As a result, unfavorable air flows over the entire length of the uncovered partial region 12 can be avoided. FIG. 5 shows the outer net 40 of the left aeroacoustic shield 34 particularly well, as well as the inner net 42 of the right aeroacoustic shield 34, wherein FIG. 6 shows the inner net 42 of the right aeroacoustic shield 34. It should still be noted that it may be sufficient to provide only one such net for each of the aeroacoustic shields 34, i.e., either only the outer net 40 or only the inner net 43 or alternatively a net provided in the middle region of the respective aeroacoustic shield 34.

The respective aeroacoustic shield 34 is exposed, for example, as soon as the cover element 10 is pushed open towards the rear. The adjustment height of the respective aeroacoustic shield 34 is designed in such a way that the respective aeroacoustic shield 34 covers the edge 30 in the partial regions 32 towards the front. The respective vertical nets 40 and 42 between the lamella 38 and the frame allow for a targeted throughflow such that undesirable noises can be avoided.

In the exemplary embodiment shown in the figures, the aeroacoustic shields 34 are pivotably mounted on the roof on their end region which is closer to the windscreen of the vehicle, in particular on the roof module. In this case, their respective pivot axis extends in parallel or substantially parallel to the transverse direction of the vehicle. Extending or exposing the aeroacoustic shields 34 when the roof opening 14 is uncovered by a displacement of the cover element 14 against the forward direction of travel of the vehicle towards the rear thus causes an end-side pivoting of the aeroacoustic shields 34 such that they can be exposed from their deposited position when the cover element 14 is arranged in the closed position, in which the aeroacoustic shields 34 are arranged in an imaginary plane which is stretched at least substantially in the longitudinal and transverse directions of the vehicle, in the manner of a ramp or inclined plane which rises towards the rear and thus so far that their respective front edge 36 is raised to the level of the front edge 30 of the cover element 10.

In summary, it should still be noted that, because of the flat shields (aeroacoustic shields) 34 according to the invention, which are arranged in the lateral frame region of the sliding roof and which are held down by the sliding cover (cover element) 10 when it is closed, and which, when the sliding cover is opened, preferably automatically by means of spring force application, only fold out towards the rear to the height of the front edge of the cover element 30, a clear reduction of the wind noise which is noticeable in the interior of the vehicle can be achieved, namely in the case of vehicles having a wind deflector 20 whose extension in the transverse direction of the vehicle is less than the width of the opening uncovered by the sliding cover.

The invention claimed is:

1. A roof for a motor vehicle, comprising:
   a cover element, wherein the cover element is movable in a longitudinal direction of the motor vehicle between a closed position for closing a partial region of a roof opening and an open position for uncovering the partial region;

a wind deflector, wherein the wind deflector is disposed on a front edge of the roof opening and wherein the wind deflector is movable between a retracted position and an extended position;

wherein the cover element is wider than the wind deflector; and a first wind deflecting element, wherein the first wind deflecting element is disposed outside the wind deflector on a first side of the wind deflector in a transverse direction of the motor vehicle and wherein the first wind deflecting element is movable between a retracted position and an extended position;

wherein in the extended position of the first wind deflecting element, the first wind deflecting element is exposed in a manner of an ascending ramp or an inclined plane towards a rear in a direction of the cover element disposed in the open position such that a first lateral outer partial region of the cover element is covered towards a front in the longitudinal direction of the motor vehicle by the first wind deflecting element.

2. The roof according to claim 1, wherein in the extended position of the first wind deflecting element, a rear edge of the first wind deflecting element, as seen in the longitudinal direction of the motor vehicle, is disposed at a same height as a front edge of the cover element, as seen in the longitudinal direction of the motor vehicle.

3. The roof according to claim 1, wherein the first wind deflecting element has a tensioning element and a flexible net which is stretched by the tensioning element in the extended position of the first wind deflecting element.

4. The roof according to claim 1 further comprising a guide rail, wherein the cover element is movable along the guide rail between the closed position and the open position and wherein the first wind deflecting element is disposed in the transverse direction of the motor vehicle outside the guide rail.

5. The roof according to claim 1, wherein the first wind deflecting element is disposed below the cover element in the closed position of the cover element.

6. The roof according to claim 4, wherein the first lateral outer partial region of the cover element is disposed outward of the guide rail in the transverse direction of the motor vehicle and wherein the first wind deflecting element is disposed below the first lateral outer partial region of the cover element in the closed position.

7. The roof according to claim 6, wherein the first wind deflecting element is disposed in front of the first lateral outer partial region of the cover element in the longitudinal direction of the motor vehicle in the open position.

8. The roof according to claim 1, wherein the first wind deflecting element is pivotally mounted on an end region of the first wind deflecting element.

9. The roof according to claim 1, further comprising a second wind deflecting element disposed outside the wind deflector on a second side of the wind deflector in the transverse direction of the motor vehicle and wherein the second wind deflecting element is movable between a retracted position and an extended position;

wherein in the extended position of the second wind deflecting element, the second wind deflecting element is exposed in a manner of an ascending ramp or an inclined plane towards the rear in the direction of the cover element disposed in the open position such that a second lateral outer partial region of the cover element is covered towards the front in the longitudinal direction of the motor vehicle by the second wind deflecting element.

10. A motor vehicle including a roof according to claim 1.

* * * * *